April 18, 1944.  G. W. HARPER  2,346,681
SPEEDOMETER DRIVE
Filed Dec. 16, 1940
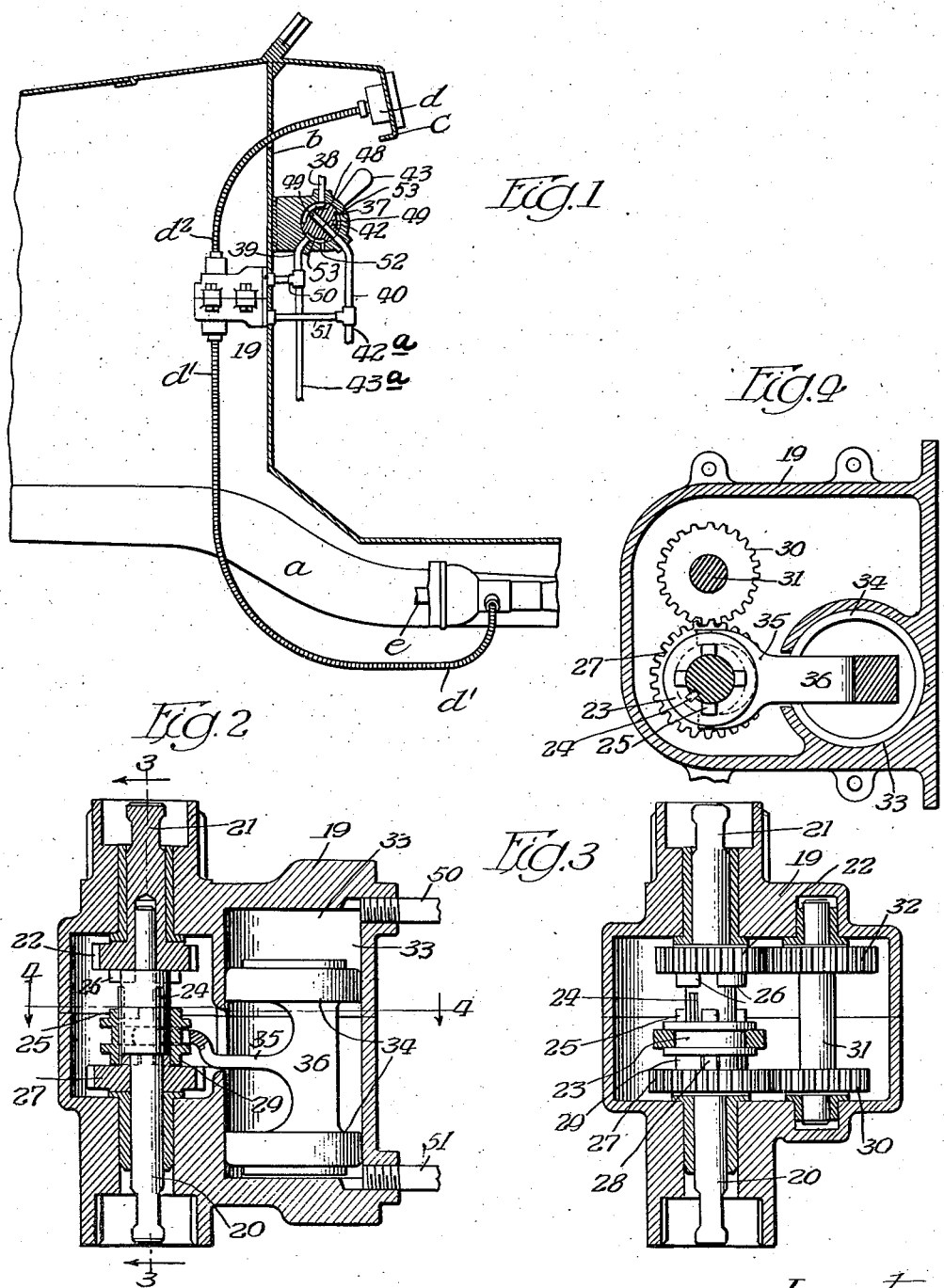
Inventor
George W. Harper
By Fred Gerlach
his Atty.

Patented Apr. 18, 1944

2,346,681

UNITED STATES PATENT OFFICE 2,346,681

SPEEDOMETER DRIVE

George W. Harper, Cleveland, Ohio, assignor, by mesne assignments, to The Timken-Detroit Axle Company, Detroit, Mich., a corporation of Ohio Application December 16, 1940, Serial No. 370,317

9 Claims. (Cl. 74—325)

The invention relates to devices used on motor-driven vehicles for controlling two-ratio gearing for driving speedometers.

In motor-driven vehicles provided with two-ratio gearing for driving the axles which are driven through the conventional variable speed transmission and in which the speedometer is driven from the propeller shaft between the transmission and the two-ratio axle gearing, it is necessary to provide compensating gearing in the speedometer drive mechanism for changes in relative speed between the vehicle wheels and the propeller shaft through the two-ratio axle gearing. Heretofore it has been the practice to provide separate control devices for the two-ratio speedometer and axle drives. A desideratum is to provide means for conjointly controlling the two-ratio speedometer and axle drives so as to avoid any incorrectness in the indications of the speedometer in the event that the operator should change the ratio of the axle gear without changing the speedometer drive, or vice versa.

The objects of the invention are to provide: means for conjointly controlling the two-ratio speedometer and axle drives; improved means for controlling the two-ratio gearing for driving the speedometer; and controlling means for the two-ratio speedometer gearing which is simple in construction and efficient in operation.

Other objects of the invention will be apparent from the following detailed description.

The invention consists in the several novel features which are hereinafter set forth and are more particularly defined by claims at the conclusion hereof.

In the drawing: Fig. 1 is a vertical section of a portion of a motor driven vehicle equipped with the invention. Fig. 2 is a vertical section through the combined suction-operable device and two-ratio gearing for driving the speedometer. Fig. 3 is a section on line 3—3 of Fig. 2. Fig. 4 is a section taken on line 4—4 of Fig. 2.

The invention is exemplified as applied to a motor driven vehicle which comprises a frame $a$, a body including a dash $b$, an instrument panel $c$, and a speedometer $d$ of usual construction. The vehicle is equipped with the usual internal combustion engine (not shown); a propeller shaft $e$ which is driven from the usual variable speed transmission; a flexible shaft section $d'$ which is driven by the usual gears from the propeller shaft $e$. The invention is also adapted to control a device (not shown) for controlling two-speed axle gearing which is usually controlled by suction and may be of any suitable construction, such as shown in Wiedmaier Patent No. 2,001,337, granted May 14, 1935, as well understood in the art.

The device for driving the speedometer $d$ at different speeds to compensate for the relative variations in the speed of the vehicle wheels when driven by the axle gearing at two ratios and the speed of the propeller shaft, comprises a casing 19 which may be mounted on the dash $b$, or in any other convenient part of the vehicle. The two-speed gearing for driving the speedometer comprises a shaft-section 20 journaled in the lower end of casing 19 to which is connected the flexible shaft-section $d'$ which is driven by the propeller shaft $e$; a shaft-section 21 journaled in the upper end of casing 19 to which is connected the flexible shaft-section $d^2$ for driving the speedometer $d$; a gear 22 fixed to shaft-section 21; a clutch-collar 23 slidably mounted on shaft-section 20 and driven by splines 24 on shaft-section 20 and provided with clutch teeth 25 adapted to be coupled to clutch teeth 26 on gear 22 for driving shaft-section 21 directly from and at the same speed as shaft-section 20; a gear 27 loose on shaft-section 20 and provided with clutch teeth 28 adapted to be engaged by clutch teeth 29 on collar 23 to drive gear 27 when the collar is uncoupled from gear 22; a gear 30 meshing with gear 27 and fixed to a counter-shaft 31 which is journaled in the casing 19; a gear 32 fixed to counter-shaft 31 and meshing with gear 22. Gears 27, 30, 32 and 22 are proportioned to drive shaft-section 21 from shaft-section 20 at a sufficient increase of speed-ratio to compensate for the relative variation in the speed of the propeller shaft $e$ and the drive axle and vehicle wheels when the latter are driven by the high ratio axle gearing from the propeller shaft.

The speedometer driving gearing is controlled to drive the speedometer at high and low speeds by a suction operable device which comprises a cylinder 33 in casing 19 and a double headed piston slidably mounted in the cylinder and adapted to be shifted by suction to the opposite ends of the cylinder, and an arm 35 on the piston-stem 36 which is extended into an annular groove in the clutch-collar 23 and adapted to shift said collar on shaft 20 to alternately couple the collar to the gear 22 to drive the shaft-section 21 at low ratio or to gear 27 to drive shaft-section 21 at high ratio. When suction is applied to the upper end of cylinder 33, piston 34 will be shifted to couple collar 23 to gear 22 for driving the shaft-section 21 at the same speed as shaft-section 20 is driven. Shaft-section 21 will then be driven at the speed-ratio to operate the speedometer while the vehicle wheels are driven by the low ratio in the axle gearing. At that time gears 32, 30 and 27 will rotate idly. When suction is applied to the lower end of cylinder 33, piston 34 will be operated to couple collar 23 to gear 27 for driving gear 30, shaft 31, gear 32 and gear 22 so that shaft-section 21 will be operated at the correct speed ratio to compensate for the driving of the vehicle wheels by the high speed two-ratio axle gearing.

Valve-means is provided for conjointly and simultaneously controlling the suction used for controlling the device for shifting the two-ratio axle gearing, and the oppostie ends of piston 34 for shifting the gearing for driving the speedometer. For this purpose, a three-way valve is mounted on the dash b or any other suitable place within convenient reach of the driver. A pipe 38 leading from the intake manifold of the internal combustion engine is connected to the casing of valve 37 and provides suction in said pipe while the engine is running. A rotatable plug 42 in the valve casing 37 is provided with an arcuate port 48 which communicates with a diametrical port 49 in the plug. Valve plug 42 is provided with a handle 43 whereby the plug may be rotated by the driver. A pipe 39 is connected to the casing of valve 37 and can be placed in communication with pipe 38 through ports 49 and 48 when the plug 42 is in one of its predetermined positions. A second pipe 40 is connected to casing 37 and can be connected to the suction pipe 38 through ports 49, 48 when the plug 42 is rotated to another predetermined position. By rotation of the plug, either of the pipes 39, 40 may be selectively connected to suction pipe 38. Pipe 39 is connected by a branch 50 to the upper end of cylinder 33 in casing 19 and by a branch 43ª to the suction device for controlling the low-speed operation of the two-ratio axle driving gearing. When suction is applied to the upper end of cylinder 33, piston 34 will be raised to couple said collar 23 with gear 22 and drive said clutch section 21 and the speedometer d at the low ratio, and the suction in branch 43ª will simultaneously shift the device for changing the axle gearing to low ratio. Pipe 40 is connected by a branch 42ª to operate the control device for driving the axle at high ratio and by a branch 51 to the lower end of cylinder 32. When pipe 40 is connected to the suction pipe 38 the control device for the axle gearing will be operated for driving the axle at high ratio and piston 34 will be simultaneously lowered to couple collar 23 with gear 27 and drive shaft-section 21 and speedometer d at high ratio through gears 27, 30, 32 and 22. Casing 37 is also provided with a port 52 and plug 42 with with ports 53, so that air can escape from the pipe 39 or 40 which is not connected to suction pipe 38 to release the air from the end of the cylinder 33 toward which the piston 34 is shifted. As a result, the driver, by means of handle 43, conjointly and simultaneously controls the fluid for controlling the two-ratio axle drive and the two-ratio speedometer drive so they will at all times be co-ordinated and the speedometer will correctly indicate or register the speed at which the vehicle wheels are traveling.

The invention exemplifies fluid pressure means for conjointly controlling the two-ratio gearing for driving the speedometer and two-ratio gearing for driving the axle. The invention also exemplifies simple and efficient suction-responsive means for controlling the gearing for driving the speedometer at different speeds to compensate for variation in the speed of the vehicle wheels relativly to the propeller shaft from which the speedometer is driven. While the fluid used is preferably suction from the intake manifold of the engine, it is to be understood that fluid under pressure, such as air, may be used to operate the fluid-controlled devices.

The invention exemplifies fluid-pressure means for conjointly controlling the two-ratio gearing to drive the speedometer at different speeds and the two-ratio axle drive. The invention also exemplifies simple and efficient fluid-pressure means for driving the speedometer at different speeds to compensate for variation in the speed of the vehicle wheels relatively to the propeller shaft from which the speedometer is driven. While the fluid used is preferably suction from the intake manifold of the engine, it is to be understood that other fluids, such as air under pressure, may be used.

The invention is not to be understood as restricted to the details set forth, since these may be modified within the scope of the appended claims, without departing from the spirit and scope of the invention.

Having thus described the invention, what I claim as new and desire to secure by Letters Patent is:

1. Equipment for controlling, by fluid-pressure controlled devices, two-ratio gearing for driving the axle of a vehicle and two-ratio gearing for driving a speedometer, respectively, comprising the combination of valve-means for controlling fluid to, and simultaneously and conjointly shifting said devices for the operation of the gearings at corresponding ratios, and means for selectively shifting said valve-means for effecting said conjoint and simultaneous control.

2. In a vehicle drive assembly, a selective multiple speed drive mechanism for a vehicle, having an energy conducting line corresponding to each speed ratio; a speedometer drive gearing having speed ratios matching the speed ratios of said multiple speed drive mechanism; energy conducting lines for each of said speedometer drive gearing ratios; and means for simultaneously energizing corresponding lines of said multiple speed drive mechanism and said speedometer drive gearing, for effecting substantially simultaneous shift thereof.

3. In a vehicle drive assembly, a drive shaft; a speedometer drive mechanism and a two-speed axle driven by said drive shaft, said speedometer drive mechanism and said two-speed axle each being shiftable into a high ratio or a low ratio; selective shift means, including a fluid-pressure actuated device for shifting said speedometer drive mechanism into high or low ratio, and means for automatically shifting said axle into high or low ratio substantially simultaneously with the shift of said speedometer drive mechanism into high or low ratio, respectively.

4. The drive assembly defined in claim 3, wherein said last-named means comprises a second fluid-pressure actuated device, energized by a source of fluid energy common to said first-named fluid-pressure actuated device.

5. In a vehicle drive assembly, a drive shaft; a two ratio speedometer drive mechanism driven by said shaft; a two-speed axle driven by said shaft; said speedometer drive mechanism and two-speed axle each having a fluid-operated device for shifting them into the high or low ratio;

and means for simultaneously energizing said fluid-operated devices for substantially simultaneously shifting said speedometer drive mechanism and said two-speed axle into either the high or low ratio.

6. In a control mechanism for a vehicle drive, low speed and high speed vacuum lines leading to an axle speed ratio changing mechanism; low speed and high speed vacuum lines leading to a speedometer ratio changing mechanism; and actuating means for simultaneously connecting either said high speed or said low speed lines to a source of vacuum.

7. The control mechanism defined in claim 6, wherein the high speed vacuum lines of said axle speed ratio changing mechanism and said speedometer ratio changing mechanism are disposed in fluid communication with each other and with a vacuum port in a control valve, and said low speed vacuum lines are disposed in fluid communication with each other and with a second port in said control valve.

8. The control mechanism defined in claim 6, wherein said actuating means comprises a two-position valve, operable in one position to place said low speed vacuum lines in communication with a source of vacuum and the high speed vacuum lines in communication with the atmosphere, and operable in the other position to place said high speed vacuum lines in communication with a source of vacuum and the low speed vacuum lines in communication with the atmosphere.

9. In a vehicle drive having a propeller shaft leading to a two-speed axle; a speedometer two-speed mechanism driven by said propeller shaft; a speedometer driven by said two-speed mechanism; a power operator for shifting said two-speed gear mechanism; a second power operator for shifting said two-speed axle from one ratio to the other; a common source of energy for actuating said power operators; and means for simultaneously energizing said power operators from said common source of energy, so as to effect substantially simultaneous shifts of said two-speed mechanism and said two-speed axle into corresponding speed ratios.

GEORGE W. HARPER.